(12) United States Patent
Yun et al.

(10) Patent No.: US 8,879,374 B2
(45) Date of Patent: Nov. 4, 2014

(54) OBJECTIVE LENS DRIVING UNIT THAT MAINTAINS ELECTRICAL CONNECTION BETWEEN SUSPENSION WIRES AND LEADS

(71) Applicant: Toshiba Samsung Storage Technology Korea Corporation, Suwon-si (KR)

(72) Inventors: Jae-kuon Yun, Suwon-si (KR); Chan-ik Lee, Suwon-si (KR); Won-seok Choi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/916,678

(22) Filed: Jun. 13, 2013

(65) Prior Publication Data
US 2013/0336101 A1  Dec. 19, 2013

(30) Foreign Application Priority Data

Jun. 13, 2012  (KR) .................. 10-2012-0063407

(51) Int. Cl.
*G11B 7/00* (2006.01)
*G11B 7/1374* (2012.01)
*G02B 7/02* (2006.01)

(52) U.S. Cl.
CPC ............... *G02B 7/02* (2013.01); *G11B 7/1374* (2013.01)
USPC ............... 369/112.23; 369/44.14; 369/44.15

(58) Field of Classification Search
None
See application file for complete search history.

(56) References Cited

U.S. PATENT DOCUMENTS

2006/0077780 A1*  4/2006  Yamada et al. ............ 369/44.14
2007/0147194 A1   6/2007  Yoshida et al.

FOREIGN PATENT DOCUMENTS

| KR | 10-1999-0035542 | 5/1999 |
| KR | 10-2005-0017686 | 2/2005 |
| KR | 10-0735109 | 7/2007 |

* cited by examiner

*Primary Examiner* — Muhammad N Edun
(74) *Attorney, Agent, or Firm* — NSIP Law

(57) ABSTRACT

Provided are an objective lens driving unit that maintains the electrical connection between suspension wires and winding bosses. The objective lens driving unit includes a plurality of winding bosses disposed at a side of the frame, each having a projection formed at its end and extending in a direction in which a suspension wire extends.

20 Claims, 6 Drawing Sheets

OBJECTIVE LENS DRIVING UNIT THAT MAINTAINS ELECTRICAL CONNECTION BETWEEN SUSPENSION WIRES AND LEADS

CROSS-REFERENCE TO RELATED APPLICATION(S)

This application claims the benefit under 35 USC §119(a) of Korean Patent Application No. 10-2012-0063407, filed on Jun. 13, 2012, in the Korean Intellectual Property Office, the entire disclosure of which is incorporated herein by reference for all purposes.

BACKGROUND

1. Field

The following description relates to an electrical connection between suspension wires and drive coils of an objective lens driving unit.

2. Description of Related Art

An objective lens driving unit in an optical pickup device generally includes a voice coil motor (VCM), a static structure, and a moving structure. The static structure typically includes a magnet and a yoke. The moving structure typically includes an electromagnet and an objective lens. In general, the moving structure is supported by a plurality of suspension wires with respect to the static structure. The suspension wires also have an electrical connection function to apply a driving voltage to a drive coil to control focus and tracking of the objective lens.

Generally, a main body of the moving structure has a winding boss around which a lead of a drive coil is wound, and the suspension wires are attached to the lead by a material such as solder. One pillar-shape boss has a structure that is adapted to prevent a lead of a drive coil from escaping, thereby preventing interferences from adjacent bosses located in close proximity thereto and achieving a stable electrical connection structure between the leads and the suspension wires.

SUMMARY

According to various aspects, there is provided an objective lens driving unit including a moving structure comprising an objective lens that has an optical axis oriented in a first direction, a plurality of drive coils that have leads for electrical connection and which control the position of the objective lens, a lens frame comprising the objective lens and the plurality of drive coils mounted thereto, and a plurality of winding bosses disposed at a side of the lens frame to fix leads of the plurality of drive coils, each winding boss comprising a projection extending in a second direction that is substantially orthogonal to the first direction, a plurality of suspension wires that each have one side fixed to the lens frame, wherein an end of the one side of each suspension wire is electrically connected to a lead of the drive coil wound around the winding boss, and a static structure including a wire holder to which the other side of each suspension wire is fixed and a magnetic circuit corresponding to the drive coils.

The plurality of winding bosses may be disposed on both sides of the lens frame parallel to a second direction, and the winding bosses on each side may be arranged in a staggered manner in the second direction so as not to overlap one another in the first direction.

The projection may be formed at one side of each winding boss.

The projection of the boss may extend in a direction which forms an acute angle with the second direction.

The drive coils may be fixed to a side of the lens frame orthogonal to the second direction.

Projections of some of the winding bosses may be disposed at one side of the lens frame and extend in a different direction than projections of the remaining winding bosses.

The optical axis may be oriented on a first axis Z-Z, the winding bosses may be aligned along a second axis Y-Y, and the projections may be aligned along a third axis X-X.

The projection may be slightly tilted at an acute angle with respect to the third axis X-X.

The projection may extend along a same direction as the plurality of suspension wires.

In an aspect, there is provided an optical pickup device including an objective lens driving unit, and a base that supports the objective lens driving unit and that has a light source and a light-receiving device therein, wherein the objective lens driving unit comprises a moving structure comprising an objective lens that has an optical axis oriented in a first direction, a plurality of drive coils that have leads for electrical connection and which control the position of the objective lens, a frame comprising the objective lens and the plurality of drive coils mounted thereto, and a plurality of winding bosses disposed at a side of the frame to fix leads of the plurality of drive coils, each winding boss comprising a projection extending in a second direction that is substantially orthogonal to the first direction, a plurality of suspension wires that each have one side fixed to the base, wherein an end of the one side of each suspension wire is electrically connected to a lead of the drive coil wound around the winding boss, and a static structure including a wire holder to which the other side of each suspension wire is fixed and a magnetic circuit corresponding to the drive coils.

The plurality of winding bosses may be disposed on both sides of the base parallel to a second direction, and the winding bosses on each side may be arranged in a staggered manner in the second direction so as not to overlap one another in the first direction.

The projection may be formed at one side of each winding boss.

The projection of the boss may extend in a direction which forms an acute angle with the second direction.

In an aspect, there is provided an objective lens driving unit including a moving member comprising an objective lens optically oriented along a Z axis, a plurality of drive coils that have leads for electrical connection and which control the objective lens, a lens frame supporting the objective lens and the plurality of drive coils, and a plurality of winding bosses disposed on each side of the lens frame along a Y axis to fix leads of the plurality of drive coils, wherein each winding boss comprises a projection extending along an X axis, a plurality of suspension wires that are each fixed to the lens frame and are electrically connected to a lead of the drive coil wound around the winding boss, and a static member including a wire holder to which the other side of the suspension wire is fixed.

The projection may be slightly tilted at an acute angle with respect to the X axis.

The projection may extend along a same direction as the plurality of suspension wires.

Other features and aspects may be apparent from the following detailed description, the drawings, and the claims.

Figure 1:
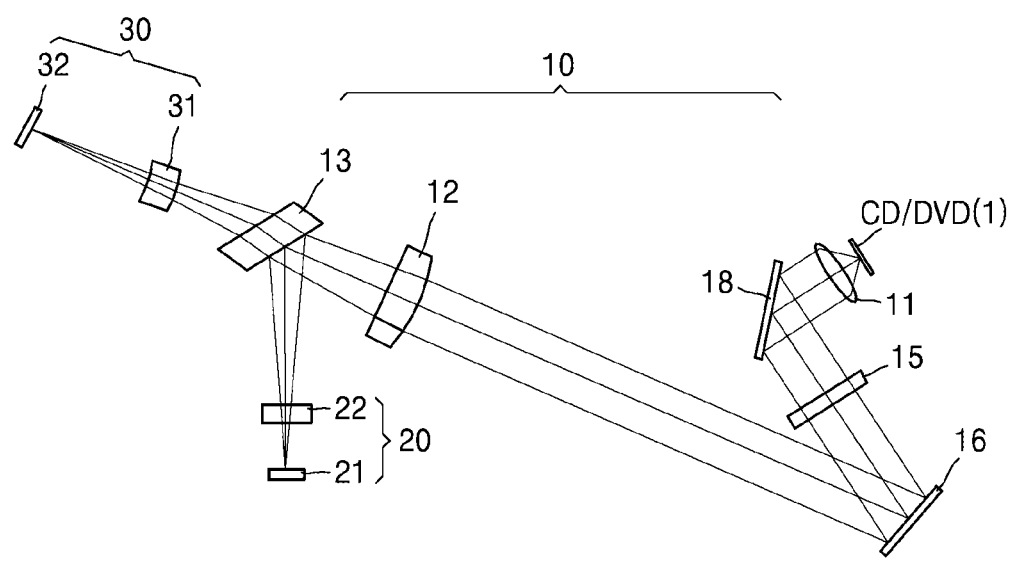
FIG. 1 is a diagram illustrating an example of an optical pickup device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical pickup device.

Referring to FIG. 1, the optical pickup device includes a light transmission system 10 corresponding to a medium 1, a light source system 20 that provides a plurality of beams for reproducing information from and/or recording information on the medium 1, and a light reception system 30 that generates an electrical signal for processing a data signal or a tracking error signal (TES) by using a light-receiving device 32. The light-receiving device 32 has three light-receiving cells for receiving three beams reflected by the medium 1 for reproducing information.

For example, the medium 1 may have a format such as a compact disc (CD), a digital versatile disk (DVD), a Blu-ray, and the like. As another example, the light source may provide three beams including a central main beam and first and second sub-beams on both sides of the central main beam.

In this example, the light source system 20 includes a light source 21 for CD/DVD and a grating element 22. A beam from the light source 21 passes through the grating element 22 and is incident on a first beam splitter 13. The grating element 22 may diffract a single beam from the light source 21 into three beams including a main beam and positive and negative first-order sub-beams.

The light reception system 30 includes the light-receiving device 32 that detects the beams reflected by the medium 1 and passing through the first beam splitter 13 and generates an electrical signal. The light reception system 30 also includes a sensing lens 31 that may focus the main beam and the first and second sub-beams with an appropriate size for the light-receiving device 32.

The light transmission system 10 includes an objective lens 11 corresponding to the medium 1a, a path changing mirror 16, a quarter wave plate (QWP) 15, a collimating lens 12, and the first beam splitter 13. The first beam splitter 13 may reflect the three beams from the light source system 20 toward the objective lens 11 or transmit light reflected by the medium 1a to the light reception system 30.

Figure 2:
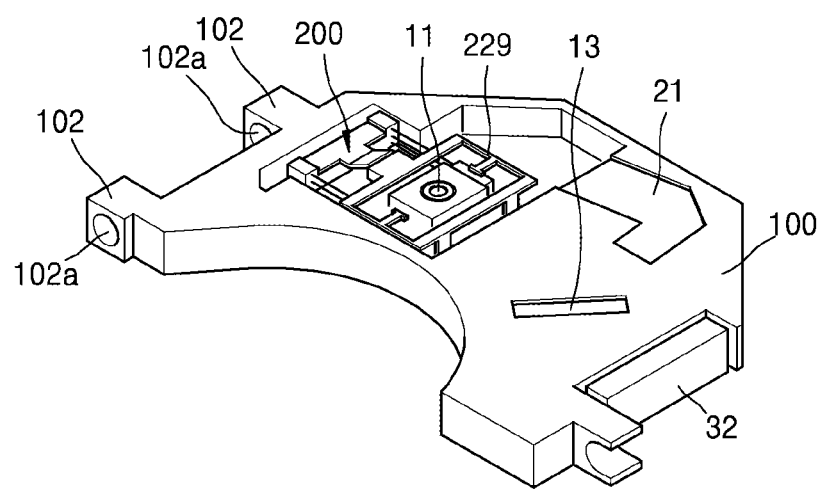
FIG. 2 is another diagram illustrating an example of the optical pickup device of FIG. 1.

The optical pickup device described herein may be assembled into one structure. For example, the optical pickup device of FIG. 1 may be included in an assembly having a construction as illustrated in FIG. 2. Referring to FIG. 2, an assembly base 100 having a predetermined thickness includes a space adapted to accommodate a plurality of optical components. For example, the assembly base 100 may be formed by aluminum die casting or plastic molding.

In this example, the assembly base 100 includes an objective lens driving unit 200 having an objective lens 11 and a protective cover 229 that surrounds the periphery of the objective lens 11. Optical components such as the first beam splitter 13, the light source 21, and the light-receiving device 32 are fixedly inserted into the assembly base 100 and arranged as shown in FIG. 1. A shaft guide portion 102 is disposed at one side of the assembly base 100 and has through-holes 102a into which a guide shaft (not shown) of an optical disc drive device (not shown) is inserted.

Figure 3:
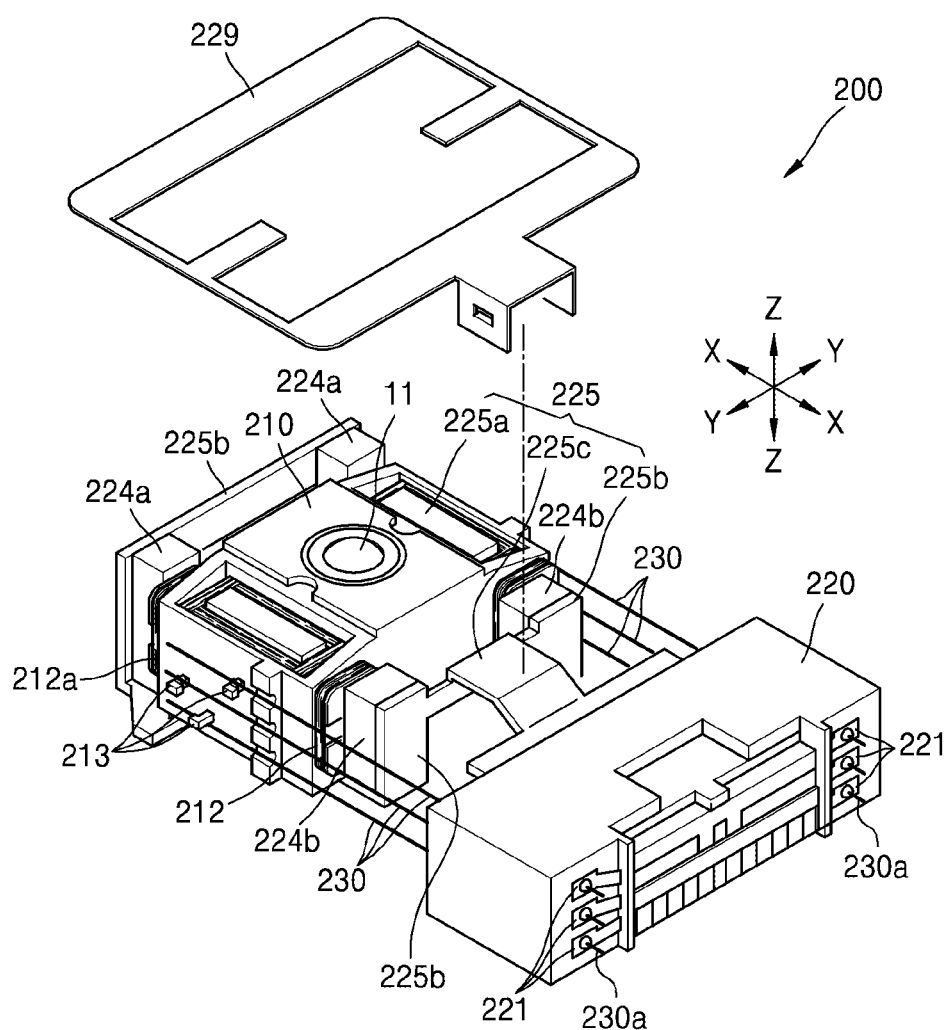
FIG. 3 is a diagram illustrating an example of an objective lens driving unit.
Figure 4:
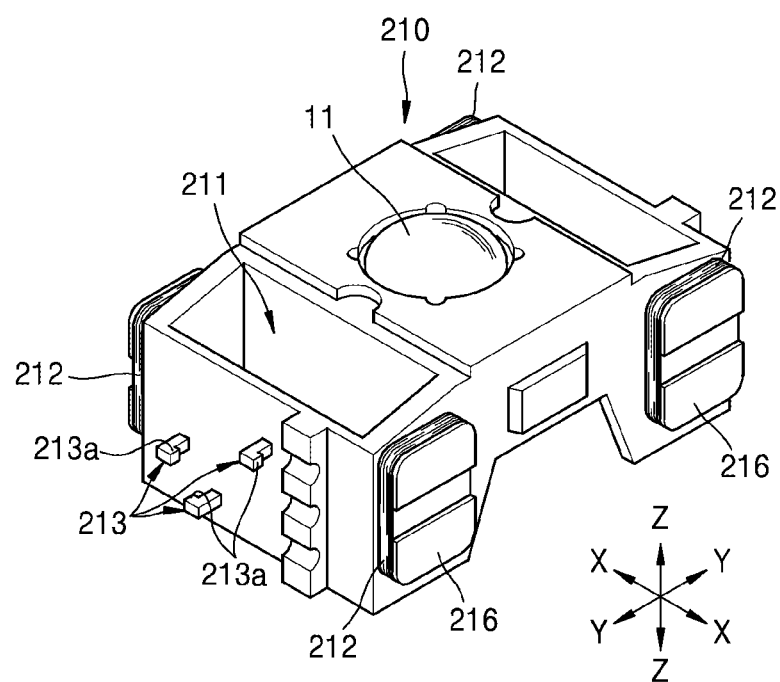
FIG. 4 is a diagram illustrating an example of a lens frame for supporting an objective lens in the objective lens driving unit of FIG. 3.
Figure 5:
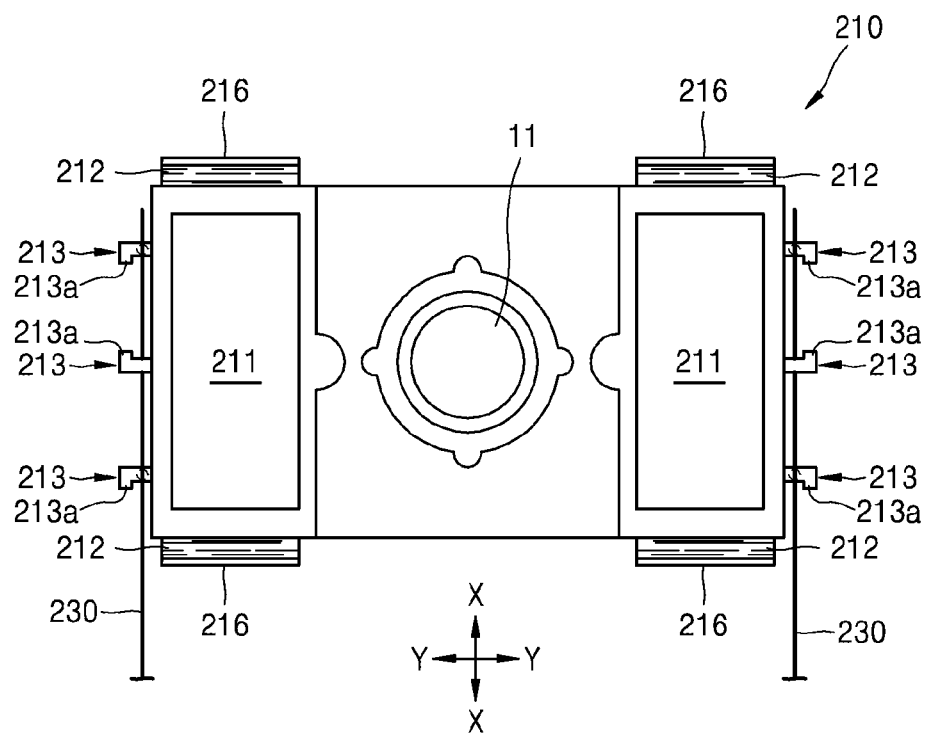
FIG. 5 is a diagram illustrating an example of the lens frame illustrated in FIG. 4.

FIG. 3 illustrates an example of the objective lens driving unit 200 used in the optical pickup device of FIGS. 1 and 2. FIG. 4 illustrates an example of a lens frame 210 for supporting the objective lens 11 in the objective lens driving unit 200. FIG. 5 illustrates an example of a lens frame 210.

Referring to FIG. 3, the objective lens 11 is disposed at a center of a top surface of the lens frame 210, and its periphery is surrounded by the protective cover 229. An optical axis of the objective lens 11 is oriented in a first direction, i.e., Z-Z axis direction. Both ends of the lens frame 210 are oriented in a third direction, i.e., a direction of a long axis (Y-Y). The ends of the lens frame 210 have quadrangular through-holes 211 in which center or inner yokes 225a are disposed. The lens frame 210 is coupled to a wire holder 220 by a plurality of suspension wires 230 that are fixed to both ends of the wire holder 220 in the direction of long axis (Y-Y).

In this example, a plurality of drive coils 212, i.e., four drive coils 212, are fixed to both sides of the lens frame 210 in the direction of short axis, two drive coils 212 for one side thereof. Each of the four drive coils 212 is electrically connected to the suspension wires 230. The four drive coils 212 are used to control the position, focusing, and tracking of the objective lens 11, two of which are disposed on one side of the lens frame 210 in a second direction, i.e., the direction of short axis (X-X). A yoke structure 225 includes the center or inner yokes 225a, outer yokes 225b, and a connection portion 225c. The connection portion 225c of the yoke structure 225 is fixed to the wire holder 220.

The objective lens driving unit 200 may include a moving structure and a static structure. For example, the moving structure includes the objective lens 11, the lens frame 210 for supporting the objective lens 11, and the plurality of drive coils 212 for focusing and tracking of the objective lens 11. The drive coils 212 are connected to wiring layers 221 provided in the wire holder 220 through the suspension wires 230. Ends of the six suspension wires 230 pass through both sides of the wire holder 220 and are coupled to the wiring layers 221 arranged in a rear surface of the wire holder 220.

The static structure includes permanent magnets 224a and 224b respectively corresponding to the four drive coils 212, the yoke structure 225, and the wire holder 220 for supporting the yoke structure 225. The permanent magnets 224a and 224b are fixed to inner surfaces of the outer yokes 225b to face the drive coils 212.

Referring to FIGS. 4 and 5, the four drive coils 212 are arranged on both sides of the lens frame 210, each pair for one side thereof. For example, one pair of drive coils 212 may be focusing coils while the other pair may be tracking coils. Bosses 213 are disposed on both sides of the lens frame 210 in the direction of long axis (Y-Y), and a lead 212a of each drive coil 212 is wound around the boss 213. A projection 213a is formed at a front edge of the boss 213 and prevents the lead 212a from escaping. The projection 213a projects out at a predetermined length in an X-X direction orthogonal to the optical axis (Z-Z). In this example, the X-X direction and the Y-Y direction form a plane that is in parallel to a recording surface (not shown) of an optical disc facing the objective lens 11. In this case, the Z-Z direction is a focusing direction, the Y-Y direction is a tracking direction, and the X-X direction is a direction in which the suspension wires 230 for supporting the lens frame 210 extend.

In this example, the projection 213a extends or projects substantially parallel to the X-X direction. This means that the projection 213a may be slightly tilted with respect to the X-X direction or extend in a direction closer to the X-X direction than other directions. As described above, the lead 212a of the drive coil 212 is wound around the projection 213a.

Figure 6:
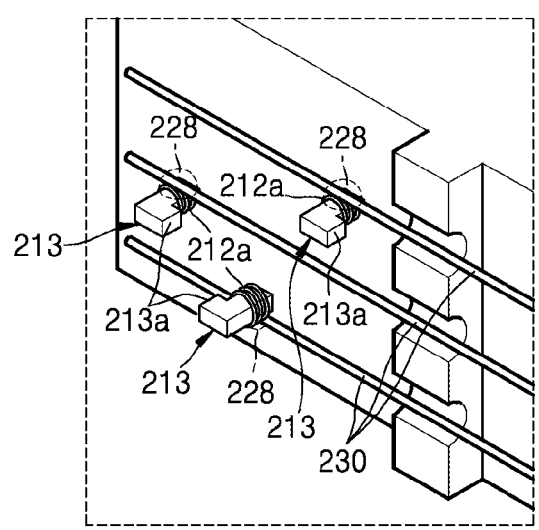
FIG. 6 is a diagram illustrating an example of a lens frame in an objective lens driving unit.
Figure 7:
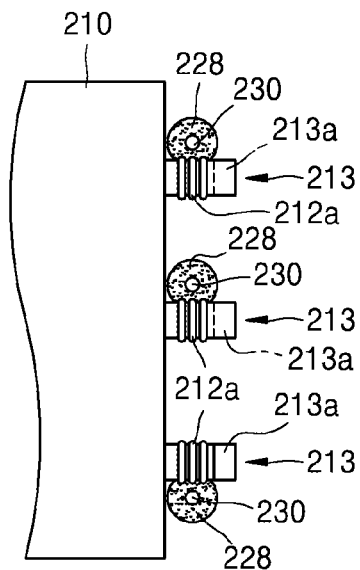
FIG. 7 is a diagram illustrating an example of a solder connection between leads and suspension wires in a lens frame of an objective lens driving unit.

FIG. 6 illustrates an example of the bosses 213 in the lens frame 210. FIG. 7 illustrates an example in which the supsension wires 230 are coupled to the leads 212a wound around the bosses 213 by a material 228 such as solder.

Referring to FIGS. 6 and 7, three bosses 213 are disposed on each side of the lens frame 210 in a staggered manner along the X-X (second) direction so that they do not overlap one another in the Z-Z (first) direction. In this example, the suspension wires 230 are electrically connected to the leads 212a that are wound around the bosses 213a, by the soldering material 228. According to various aspects, the soldering material 228 for fixing the suspension wires 230 to the leads 212a may maintain a stable strong bond therebetween, thereby preventing a wiring defect due to a soldering failure. An example of a soldering failure is described with reference to FIGS. 8 and 9.

Figure 8:
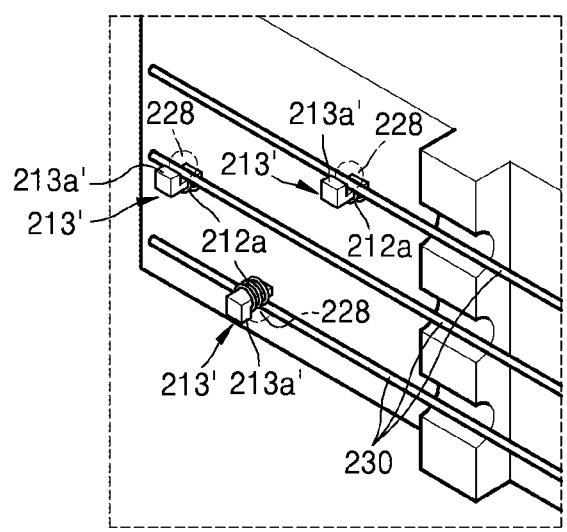
FIG. 8 is a diagram illustrating an example of a conventional lens frame.
Figure 9:
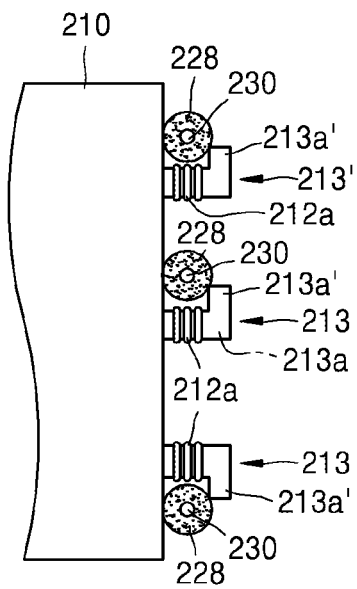
FIG. 9 is a diagram illustrating an example of a defective solder connection between leads and suspension wires in the conventional lens frame of FIG. 8.

FIG. 8 illustrates an example of the shape of bosses 213' in a lens frame, and a state of a solder connection between the bosses 213' and the suspension wires 230 connected thereto. FIG. 9 illustrates an example in which a connection between the suspension wires 230 and the bosses 213' is electrically opened due to a soldering failure.

As shown in FIGS. 8 and 9, the projection 213a' of the boss 213' extends in the Z-Z direction. The Z-Z direction is in both the direction of an optical axis of an objective lens and the direction in which solder is supplied during soldering. Thus, the sufficient soldering material 228 is not supplied to the lead 212a and the suspension wire 230 due to the projection 213a', which can cause a failure in an electrical connection therebetween. For example, the projection 213a' may retard the supply of the soldering material 228 between the lead 212a and the suspension wire 230. As a result, the soldering material 228 wrapped around the suspension wire 230 does not align flush with the lead 212a of the boss 213. As a result, the electrical connection between the suspension wire 230 and the boss 213 is broken.

Unlike the arrangement of projections 213a', the arrangement of the projections 213a according to various aspects may not hamper the supply of solder between the lead 212a and the suspension wire 230. According to various aspects, the boss 213 may extend in a direction in which the objective lens 11 in the lens frame 210 performs a tracking operation. A projection 213b may project out from an end of the boss 213 in a direction that the suspension wire 230 extends, e. g., toward or away from the wide holder 220. In this example, the projections 213b of all the bosses 213 may extend in the same direction, or some of them may extend in a different direction.

Figure 10:
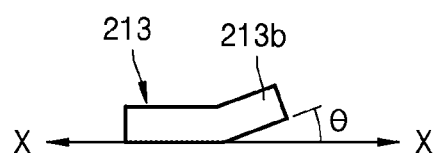
FIGS. 10 and 11 are diagrams illustrating examples of bosses in a lens frame of an objective lens driving unit.
Figure 11:
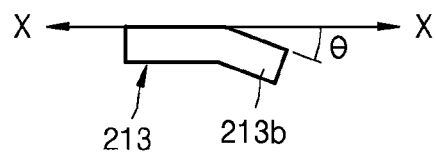

Alternatively, as shown in FIGS. 10 and 11, the projection 213b may be slightly tilted with respect to the X-X direction in which the suspension wire 230 extends so as not to hamper the supply of a soldering material. In this example, unlike the projection 213a' extending in the Z-Z direction, the projection 213b may be tilted in a direction slightly deviating from or orthogonal to the Z-Z direction. For example, the projection 213b may be tilted at an acute angle with respect to the direction that the suspension wire 230 extends.

In the objective lens driving units and the optical pickup devices according to various aspects, a failure of soldering between the suspension wire 230 and the lead 212a may be prevented, thereby preventing degradation in product reliability and increase in the manufacturing cost due to a soldering failure caused by a conventional structure.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An objective lens driving unit comprising:
a moving structure comprising an objective lens comprising an optical axis oriented in a first direction, drive coils comprising leads for electrical connection and configured to control the position of the objective lens, a lens frame comprising the objective lens and the drive coils mounted thereto, and winding bosses disposed at a side of the lens frame configured to fix leads of the drive coils, each winding boss comprising a projection extending in a second direction substantially orthogonal to the first direction and comprising a lead of a drive coil wound around the respective winding boss;
suspension wires that each comprise one side fixed to the lens frame, wherein an end of the one side of each suspension wire is electrically connected to a lead of a drive coil wound around a winding boss; and
a static structure including a wire holder to which the other side of each suspension wire is fixed and a magnetic circuit of the drive coils.

2. The objective lens driving unit of claim 1, wherein the winding bosses are disposed on both sides of the lens frame parallel to a second direction, and the winding bosses on each side are arranged in a staggered manner in the second direction so as not to overlap one another in the first direction.

3. The objective lens driving unit of claim 1, wherein the projection is formed at one side of each winding boss.

4. The objective lens driving unit of claim 1, wherein the projection of the winding boss extends in a direction which forms an acute angle with the second direction.

5. The objective lens driving unit of claim 1, wherein the drive coils are fixed to a side of the lens frame orthogonal to the second direction.

6. The objective lens driving unit of claim 1, wherein projections of one of the winding bosses disposed at one side of the lens frame extend in a different direction than projections of the remaining winding bosses.

7. The objective lens driving unit of claim 1, wherein the optical axis is oriented on a first axis Z-Z, the winding bosses are aligned along a second axis Y-Y, and the projections are aligned along a third axis X-X.

8. The objective lens driving unit of claim 7, wherein the projection is slightly tilted at an acute angle with respect to the third axis X-X.

9. The objective lens driving unit of claim 1, wherein the projection extends along a same direction as the suspension wires.

10. The objective lens driving unit of claim 1, wherein an axis of the lead of the drive coil is perpendicular to an axis along which the suspension wires extend.

11. The objective lens driving unit of claim 1, wherein the drive coils comprise focusing coils disposed on a side of the lens frame and tracking coils disposed on an opposite side of the lens frame.

12. The objective lens driving unit of claim 1, wherein the winding bosses comprise a first section extending in a third direction that is substantially orthogonal to the second direction.

13. The objective lens driving unit of claim 12, wherein the leads of the drive coils are wound around the first section of the winding bosses.

14. An optical pickup device comprising:
an objective lens driving unit; and
a base that supports the objective lens driving unit and that has a light source and a light-receiving device therein, wherein the objective lens driving unit comprises:
a moving structure comprising an objective lens comprising an optical axis oriented in a first direction, drive coils comprising leads for electrical connection and which control the position of the objective lens, a frame comprising the objective lens and the drive coils mounted thereto, and winding bosses disposed at a side of the frame and configured to fix leads of the drive coils, each winding boss comprising a projection extending in a second direction substantially orthogonal to the first direction and comprising a lead of a drive coil wound around the respective winding boss;
suspension wires that each have one side fixed to the base, wherein an end of the one side of each suspension wire is electrically connected to a lead of a drive coil wound around a winding boss; and
a static structure including a wire holder to which the other side of each suspension wire is fixed and a magnetic circuit of the drive coils.

15. The optical pickup device of claim 14, wherein winding bosses are disposed on both sides of the base parallel to a second direction, and the winding bosses on each side are arranged in a staggered manner in the second direction so as not to overlap one another in the first direction.

16. The optical pickup device of claim 14, wherein the projection is formed at one side of each winding boss.

17. The optical pickup device of claim 16 the projection of the boss extends in a direction which forms an acute angle with the second direction.

18. An objective lens driving unit comprising:
a moving member comprising an objective lens optically oriented along a Z axis, drive coils comprising leads for electrical connection and configured to control the objective lens, a lens frame supporting the objective lens and drive coils, and winding bosses disposed on each side of the lens frame along a Y axis and configured to fix leads of the drive coils, wherein each winding boss comprises a projection extending along an X axis and comprises a lead of a drive coil wound around the respective winding boss;
suspension wires that are each fixed to the lens frame and are electrically connected to a lead of a drive coil wound around a winding boss; and
a static member including a wire holder to which the other side of the suspension wire is fixed.

19. The objective lens driving unit of claim 18, wherein the projection is slightly tilted at an acute angle with respect to the X axis.

20. The objective lens driving unit of claim 18, wherein the projection extends along a same direction as the suspension wires.

* * * * *